No. 802,714. PATENTED OCT. 24, 1905.
W. B. SMITH.
FILTER.
APPLICATION FILED OCT. 15, 1902.

2 SHEETS—SHEET 1.

Witnesses
Ivan Konigsberg
Harry H. Walton

William Blackburn Smith,
Inventor
By his Attorney
Alexander C. Proudfit.

No. 802,714. PATENTED OCT. 24, 1905.
W. B. SMITH.
FILTER.
APPLICATION FILED OCT. 15, 1902.
2 SHEETS—SHEET 2.
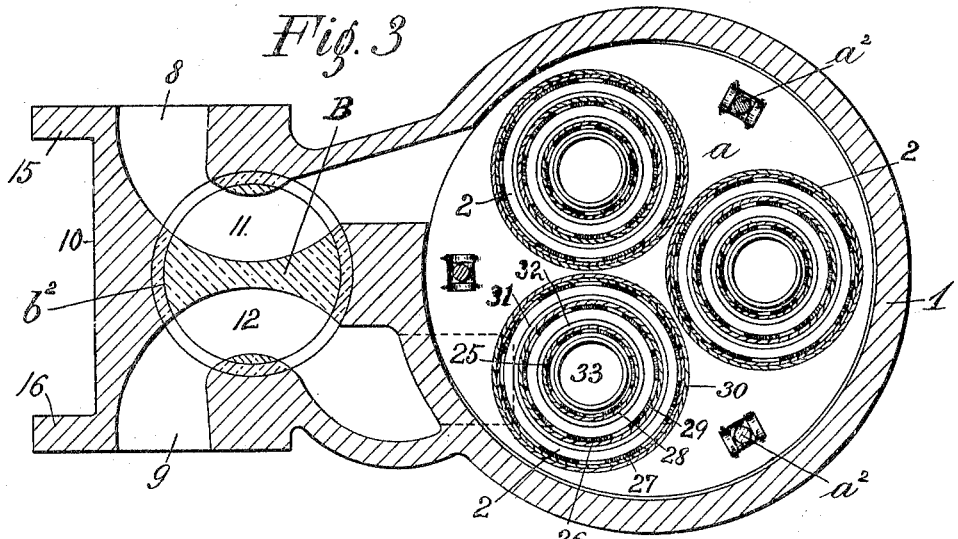
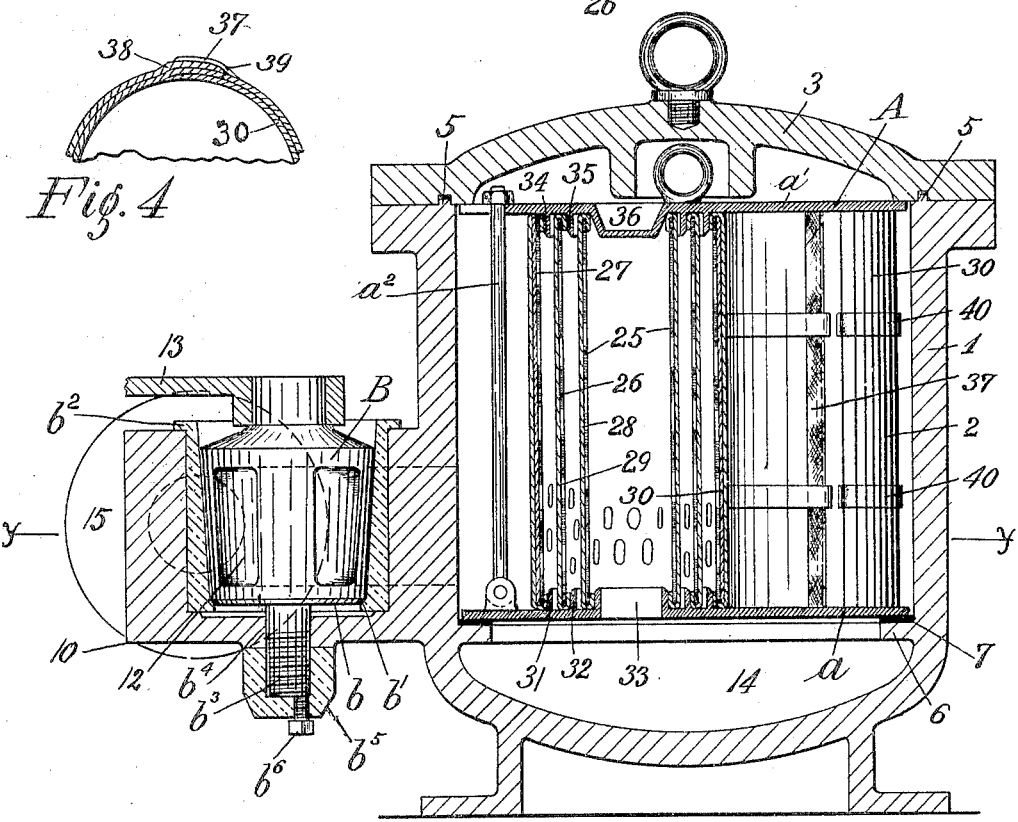
William Blackburn Smith, Inventor
Witnesses
Ivan Königsberg
Harry H. Walton
By his Attorney
Alexander C. Proudfit

UNITED STATES PATENT OFFICE.

WILLIAM BLACKBURN SMITH, OF PERTH AMBOY, NEW JERSEY, ASSIGNOR TO BLACKBURN SMITH COMPANY, OF JERSEY CITY, NEW JERSEY, A CORPORATION OF NEW JERSEY.

FILTER.

No. 802,714.　　　Specification of Letters Patent.　　　Patented Oct. 24, 1905.

Application filed October 15, 1902. Serial No. 127,392.

*To all whom it may concern:*

Be it known that I, WILLIAM BLACKBURN SMITH, a subject of the King of England, and a resident of Perth Amboy, New Jersey, have invented certain Improvements in Filters, of which the following description, in connection with the accompanying drawings, is a specification, like characters on the drawings designating like parts.

This invention relates to filters for use in connection with steam-plants and similar uses, being of special utility in connection with filtering water for steam-boilers.

The object of my invention is to produce a filter of simple construction in which the necessity for machine-work will be reduced to a minimum, the parts rendered easy of access and few in number, with devices tending to aid in the efficient operation of the apparatus as a whole.

The various features of my invention will be illustrated and described fully in the accompanying drawings and specification and pointed out in the claims.

Figure 1:
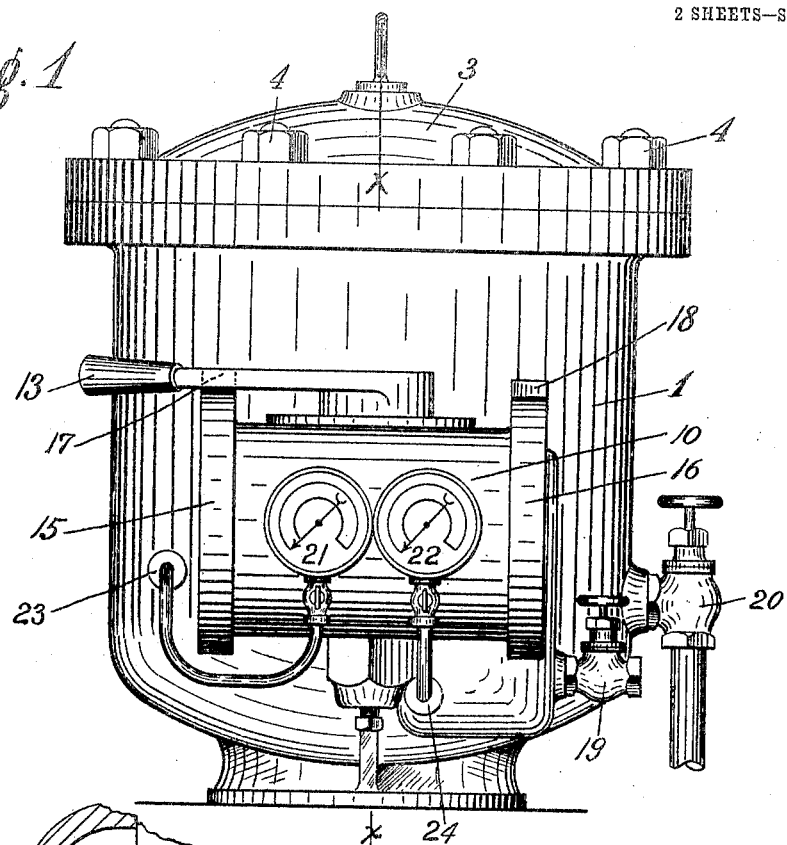

In the drawings, Figure 1 illustrates in vertical elevation a filter in the construction of which my improvements have been embodied. Fig. 2 is a vertical section on the line $x\,x$, Fig. 1. Fig. 3 is a horizontal section on the line $y\,y$, Fig. 2. Fig. 4 is a detail view of a filter-cloth, and Fig. 5 a view similar to Fig. 3 of a modified form of casing.

In the embodiment of my invention selected for illustration and description as a convenient form to enable a ready and complete understanding of my improvements the part designated by the reference-numeral 1 is a filter-casing within which are the filter-cartridges 2. The form of the casing may be modified somewhat without departing from the spirit of my invention, but I prefer to have the body part arranged vertically, as illustrated, with a closure 3, provided with fastening-bolts or other means 4, a tongue-and-groove packing 5 being utilized, if desired, to make a tight joint. Within the casing at the bottom of the filter-chamber will preferably be provided a ledge or constriction 6 to receive and support the bottom plate $a$ of the filter-cartridge cage A, and a gasket may be provided, thereby avoiding the necessity for machining either the cartridge or ledge.

In accordance with my invention the inlet and outlet passages are arranged in such a manner—for example, as the near-lying passages 8 9—to permit the use of a single controlling valve device, preferably a rotary valve, as illustrated at B, for which may be provided a chest 10, the valve having means which in one position of the valve will permit flow of fluid through the filter, as the channels 11 12, which constitute continuations of the inlet and outlet passages, respectively, the valve device being movable to by-pass the fluid from the inlet to the outlet passages to short-circuit the filter. By a quarter-turn of the valve, which may be provided with a suitable actuating device, such as the handle 13, it is obvious that the valve will act as a by-pass—as, for example, when the handle is turned to the right from the position shown in Fig. 1—the feed-pump and boiler will be placed in direct communication through the passages 8 11 9, and the channel 12 will similarly connect the filter-chamber with the pure-water chamber 14. When the valve device is in the position illustrated in Figs. 2 and 3, the water from the feed-pump will enter through the channels 8 and 11 to the filter-chamber, pass through the filter-cartridge into the pure-water chamber 14, whence it will flow through the channels 12 and 9 into the boiler.

Fig. 2 illustrates the preferred form of rotary valve comprising a body portion B, preferably conical, having at its nose a beveled portion or auxiliary seat $b$ to coöperate with a seat $b'$ in the chest or casing, the seat preferably being formed in a bushing $b^2$, separable from the casing, this form of construction serving to prevent jamming of the valve or its seats, while the separable bushing may readily be removed for repairs or renewal. To retain the valve in place, suitable means may be provided—as, for example, a threaded stem $b^3$, projecting through the casing at $b^4$ and having a retaining-nut $b^5$ with set-screw $b^6$.

Suitable connecting means, as the flanges 15 16, may be provided for attachment of the service-pipes, and on these flanges I have shown stops 17 18 for the handle 13.

Figure 5:
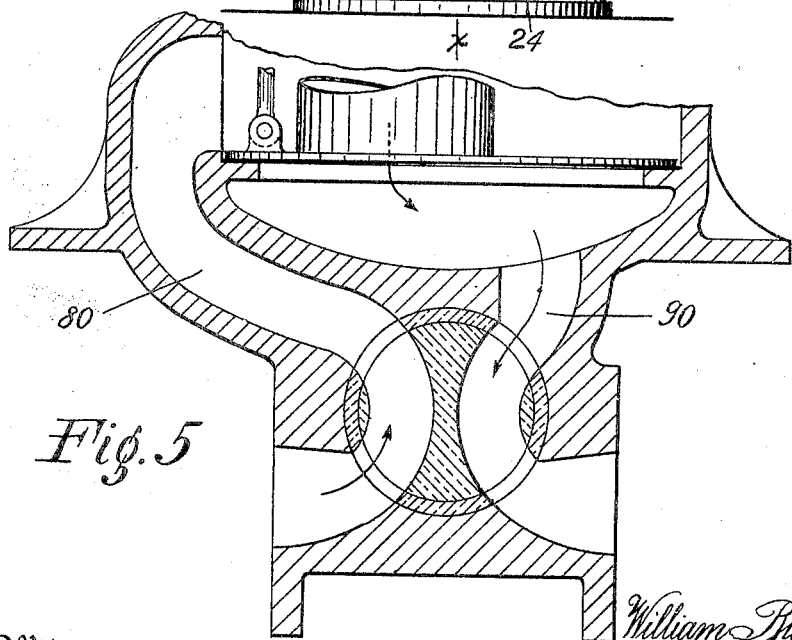

In Fig. 5 the channels 80 and 90 are brought together in the longitudinal axis of the filter instead of at one side thereof, a form of construction which may be of advantage in certain situations.

To clean the filter, steam may be admitted through a valve 19 to the filter-chamber and the soil carried off through a sludge-valve 20.

As one of my improvements, designed to add to the ease with which the apparatus may be used and at its highest efficiency, I prefer to provide the casing with a plurality of pressure-gages 21 22, one tapped into the filter-chamber at 23 and the other into the pure-water chamber or outlet-passage, as at 24, the difference in reading of the two gages giving the exact pressure upon the filtering medium.

Any suitable form of filter-cartridge may be used in the filter-chamber, but I prefer to utilize the improved cartridge, (best illustrated in Fig. 2), in which several concentric foraminated tubular supports 25, 26, and 27 are nested with filter-cloths 28, 29, and 30 wound about them and turned over their ends, respectively, annular separating bosses or nozzles 31 to 36 serving as positioning devices, between which and the ends of the tubes the filter-cloths are wedged. Each of these nests of tubes with its filter medium constitutes a filter unit, the water entering from the outside and passing from the inside through the central nozzle into the pure-water chamber, and the degree of filtration will depend upon the number of concentric tubes in each nest. There may be as many nests as desired, and a convenient way to arrange the same is to group them between plates $a$ and $a'$, providing connecting-rods $a^2$ to hold them in assembled relation. Either or both of these plates may be provided with the bosses or nozzles above mentioned.

When renewal of the filter medium is desirable, it is simply necessary to by-pass the feed-water by moving the rotary-valve lever through an arc of ninety degrees, after which the cover can be taken off, foul cartridges lifted out, and a clean spare set inserted. The dirty medium is then washed in boiling water and soda and it is ready for use again.

In Figs. 2 and 4 I have shown my preferred form of filter-cloth and holding means therefor, the cloth 27 being a long strip of toweling or the like wound upon itself around the support and provided with a flap 37 to protect its free edge 38, the flap being preferably secured, as by stitching 39, at such a distance from the end 38 that when the cloth is wound on the flap will receive the end 38 under it. The flap may be stiff fabric, and clips 40 may be used to secure it.

Having described thus fully the nature of my improvements and in what manner the same may be utilized, it will be understood that I do not limit myself to the specific material or construction described and illustrated, nor in general otherwise than as set forth in my claims read in connection with this specification.

What I claim, and desire to secure by Letters Patent, is—

1. A cartridge for filters of the class described comprising a tubular support, a filter-cloth wrapped thereabout, and a flap secured to the body of said cloth and presenting a free edge to overlie the free edge of said cloth substantially as described.

2. A cartridge for filters of the class described, comprising a tubular support, a filter-cloth wrapped thereabout provided with an edge-protecting flap operating in the manner set forth, and securing means outside said flap.

3. Filtering means for filter-cartridges of the class having a tubular support, comprising a filter-cloth to be wrapped around said tubular support and tucked in at the ends thereof, an edge-protecting flap operating in the manner set forth, and clips or bands to secure said flap against displacement.

4. A filter-cloth to be wrapped about a tubular support and provided with a flap stitched transversely of said cloth at a distance from the outer end sufficient to insure presentation of the free edge of said flap in position to overlie the free edge of said cloth when in place upon said support, substantially as described.

5. A compound filter device for filtering apparatus of the class described; comprising a plurality of perforated tubular supports of different diameters, each provided with filtering material extending around the ends respectively; comprising a filter-cloth wrapped thereabout provided with an edge-protecting flap operating in the manner set forth, said tubular supports being nested; and abutments for the two ends of said nest of tubular supports, said abutments having each a plurality of concentric annular bosses to enter respectively each of said tube ends and thereby hold said tubes with said filtering material cramped upon said ends and thereby held in place, substantially as described.

6. A compound filter device for filtering apparatus of the class described; comprising a plurality of foraminous tubular supports of different diameters, each provided with filtering material extending around said supports respectively from end to end, and tucked in at one end thereof, said tubular supports being nested; said filtering material comprising a filter-cloth provided with an edge-protecting flap operating in the manner set forth and abutments for the two ends of said nest of tubular supports, one of said abutments having a plurality of concentric annular bosses to enter respectively each of said tube ends and thereby hold said tubes in coaxial relation with said filtering material cramped upon said ends and thereby held in place, the central one of said bosses and its abutment having an aperture whereby it constitutes a nozzle for passage of fluid to or from the interior of said nest, substantially as described.

Signed at New York, in the county of New York and State of New York, this 13th day of October, A. D. 1902.

WILLIAM BLACKBURN SMITH.

Witnesses:
ALEXANDER C. PROUDFIT,
HARRY H. WALTON.